(12) United States Patent
Jun

(10) Patent No.: US 6,172,442 B1
(45) Date of Patent: Jan. 9, 2001

(54) DISK-TYPE BRUSHLESS SINGLE-PHASE DC MOTOR

(75) Inventor: Chang Keun Jun, Kyungki-Do (KR)

(73) Assignee: Samsung Electro-Mechanics Co., Ltd., Suwon (KR)

( * ) Notice: Under 35 U.S.C. 154(b), the term of this patent shall be extended for 0 days.

(21) Appl. No.: 09/191,993

(22) Filed: Nov. 13, 1998

(30) Foreign Application Priority Data

Nov. 13, 1997 (KR) .................................. 97-59706

(51) Int. Cl.$^7$ .......................... H02K 15/00; H02K 21/12
(52) U.S. Cl. ...................... 310/268; 310/156; 310/67 R; 310/42
(58) Field of Search .................... 310/156, 268, 310/DIG. 6, 42, 67 R

(56) References Cited

U.S. PATENT DOCUMENTS

| 4,620,139 | 10/1986 | Egami et al. | 318/254 |
|---|---|---|---|
| 4,704,566 | * 1/1987 | Hirano et al. | 318/254 |
| 4,725,752 | * 2/1988 | Shiraki et al. | 310/268 |
| 4,733,119 | * 3/1988 | Shiraki et al. | 310/268 |
| 4,757,222 | 7/1988 | Shiraki et al. | 310/68 |
| 4,891,537 | * 1/1990 | Shiraki et al. | 310/68 B |
| 4,973,869 | * 11/1990 | Cho | 310/68 B |
| 5,097,170 | * 3/1992 | Baines | 310/268 |
| 5,101,131 | * 3/1992 | Ushiro et al. | 310/258 |

FOREIGN PATENT DOCUMENTS 7213041  8/1995  (JP).

OTHER PUBLICATIONS

Patent Abstracts of Japan of JP 07 21 3041 of Aug. 1995.

* cited by examiner

*Primary Examiner*—Burton Mullins
(74) *Attorney, Agent, or Firm*—Ladas & Parry

(57) ABSTRACT

A disk-type brushless single-phase DC motor comprising a single armature coil attached to a stator yoke of a stator, the armature coil having a closed loop structure. The armature coil has a plurality of uniformly spaced apexes corresponding in number to ½ of the number of poles in a rotor magnet. The armature coil also has sides each connecting neighboring apexes of the armature coil while being radially curved. Cogging generating protrusions are protruded from the stator yoke at positions spaced in a rotation direction of the rotor magnet from respective apexes of the armature coil by a desired angle. The armature coil having a closed loop structure maximizes an effective coil torque generated whereas the cogging generating protrusions generates an optimum cogging torque. Accordingly, it is possible to provide a stable drive performance even when a smaller amount of current is supplied, while achieving an improvement in assembling workability.

4 Claims, 8 Drawing Sheets

DISK-TYPE BRUSHLESS SINGLE-PHASE DC MOTOR

BACKGROUND OF THE INVENTION

1. Field of the Invention

The present invention relates to a disk-type brushless single-phase DC motor, and more particularly to a disk-type brushless single-phase DC motor including an armature coil attached to a stator yoke of a stator in such a fashion that it faces the lower surface of a rotor magnet having a plurality of alternating N and S poles, the armature coil having a closed loop structure provided with a plurality of uniformly spaced apexes, and cogging generating protrusions of a miniature size protruded from the stator yoke at positions spaced in a rotation direction of the rotor magnet from respective apexes of the armature coil by an angle corresponding to ¼ of an angular width of one pole, thereby being capable of achieving an improvement in drive efficiency.

2. Description of the Prior Art

Generally, disk-type brushless single-phase DC motors are used in miniature fan motors for simple rotating appliances requiring no precise rotation, for example, office appliances such as computers.

Referring to FIG. 8 a disk-type brushless single-phase DC motor is illustrated which includes a housing 100 constituting a lower portion of the motor and serving to support elements of the motor, and a rotor 300 constituting an upper portion of the motor and arranged over the housing 100. The rotor 300 is rotatably coupled to the housing 100 by means of a shaft 200.

A multipolar rotor magnet 310 is mounted on the lower surface of the rotor 300 within the rotor 300. The multipolar rotor magnet 310 has a plurality of alternating N and S poles. The upper end of the shaft 200 is fixedly mounted to the central portion of the rotor 300. The shaft 200 extends downwardly through a bearing housing 110 upwardly protruded from the central portion of the housing 100 in such a fashion that it is rotatably supported by bearings mounted in the bearing housing 110. The upper end of the bearing housing 110 has a stepped structure in order to fixedly mount a stator 400 thereon.

The stator 400 mainly includes a printed circuit board 410, a stator yoke 420 laid on the printed circuit board 410, and armature coils 430 attached to the upper surface of the stator yoke 420 by means of an adhesive.

The driving of the disk-type brushless single-phase DC motor having the above mentioned configuration is achieved by a rotation of the rotor 300 carried out by an electromagnetic force generated between the armature coils 430 of the stator 400 and the rotor magnet 310.

This will be described in more detail. When single-phase current is supplied to the armature coils 430 via the printed circuit board 410, an electromagnetic force is generated in accordance with an interaction between the armature coils 430 and the rotor magnet 310, thereby generating a drive force. By this drive force, the rotor 300 rotates.

In this case, a coil torque 600 is generated between the armature coils 430 and the rotor magnet 310 by the electromagnetic force, as shown in FIG. 9. The coil torque exhibits a maximum value at the middle portion of each pole in the rotor magnet 310 and decreases gradually as the pole extends from the middle portion thereof to each lateral end thereof. The coil torque becomes zero at each lateral end of each pole, thereby causing the rotor 300 to stop.

The point, where the coil torque is zero, is called a "dead point". A cogging generating means is provided for a magnetic start-up at such a dead point.

Such a cogging generating means provides a cogging force serving as a load against the coil torque. Such a cogging force is adapted to increase the minimum coil torque while decreasing the maximum coil torque, thereby obtaining a substantially uniform torque. That is, a cogging torque, which has a waveform 700 in FIG. 9, is generated simultaneously with the generation of the coil torque, which has a waveform 600 in FIG. 9, thereby obtaining an ideal resultant torque which has a waveform 800 in FIG. 9. The cogging torque, which serves as a load against the coil torque, has an output level inversely proportional to the output level of the coil torque, thereby reducing the variation in the resultant torque. As a result, the motor can drive stably.

A variety of motors provided with such a cogging means have been proposed in, for example, U.S. Pat. No. 4,620,139, U.S. Pat. No. 4,757,222, and Japanese Patent Publication No. Heisei 7-213041. The cogging means disclosed in the patents generates an appropriate cogging torque serving as a load against a coil torque. In accordance with a combination of the cogging torque and coil torque, an ideal resultant torque is obtained.

Meanwhile, the coil torque and cogging torque exhibit a phase difference corresponding to about ¼ of the pole width therebetween. Accordingly, the cogging generating means is arranged at a position where the coil torque is zero during a rotation of the rotor.

In U.S. Pat. Nos. 4,620,139 and 4,757,222, as shown in FIG. 10, the cogging generating means comprises iron cores 440 coupled to or fitted to the stator yoke 420 in such a fashion that they are protruded from the stator yoke 420 toward the rotor magnet 310. Alternatively, the cogging generating means may be provided by cutting out opposite arc-shaped peripheral portions of the stator yoke 420, as shown in FIG. 11. In this case, the cogging generating means comprises arc-shaped cutouts 450. In both cases, however, there is a problem in that it is difficult to determine an accurate position of the cogging generating means because the position of the cogging generating means has an inseparable relation with the attachment position of the armature coil.

In both cases, an accurate position for installing the cogging generating means thereon is first determined with respect to each armature coil 430 attached to the stator coil 420. The coupling or fitting of the iron core 440 to the stator coil 420 is carried out at the determined position. In the case wherein the arc-shaped cutouts are used as the cogging generating means, those cutouts are formed at positions determined as above, respectively. However, the position determination for the cogging generating means is very difficult unless a jig is used.

Since a pair of armature coils 430 are practically attached to the stator yoke 420 in such a fashion that they are opposite to each other, a great loss of magnetic force occurs at stator yoke portions where no armature coil is attached, thereby generating a reduced coil torque. As a result, an insufficient drive torque is obtained. This results in a considerable performance degradation.

On the other hand, in Japanese Patent Publication No. Heisei 7-213041, the cogging generating means comprises magnetic members 460 as shown in FIG. 12. Each magnetic member 460 is positioned at an angle θ (0<θ<π, where π is an electrical angle and equal to 180°) from the dead point. In particular, the magnetic members have a screw construction so that they also serve as a fixing means for fixing the printed circuit board 410 and stator yoke 420 to each other.

In this case, however, the screw members preferentially have the function for fixing the printed circuit board 410 and stator yoke 420 to each other over the cogging generating function. For this reason, after the printed circuit board 410 and stator yoke 420 are fixed to each other, the screw members may have different gaps with respect to the associated rotor magnets 310, respectively. As a result, the cogging torque generated by the cogging generating means may vary for different screw members.

In other words, a difference in fastening degrees of the screw members result in a variation in the magnetic force generated by the rotor magnets 310, thereby generating an instable drive torque.

In the case of a miniature motor, furthermore, it is impossible to fasten the magnetic members 460 having a very small size unless a specific tool is used. Moreover, it is also impossible to adjust the fastening degree of the magnetic members 460. Consequently, it is impossible to practically apply such a construction to miniature motors.

SUMMARY OF THE INVENTION

Therefore, an object of the invention is to provide a disk-type brushless single-phase DC motor including an armature coil arranged on a stator yoke and having a shape capable of generating a maximized effective coil torque, and cogging generating protrusions respectively arranged at positions spaced from apexes of the armature coil by a desired angle while being integral with the stator yoke, thereby being capable of stably outputting an ideal drive torque even when a smaller amount of current is supplied.

Another object of the invention is to provide a disk-type brushless single-phase DC motor including cogging generating protrusions capable of appropriately coping with a variation in the use purpose of the motor by a simple variation in the structure thereof while generating an optimum torque.

Another object of the invention is to provide a disk-type brushless single-phase DC motor capable of generating a stable and sufficient drive torque even when the amount of supply current is minimized.

In accordance with the present invention, these objects are accomplished by providing a disk-type brushless single-phase DC motor comprising a single armature coil attached to a stator yoke of a stator, the armature coil having a closed loop structure.

The armature coil has a plurality of uniformly spaced apexes corresponding in number to ½ of the number of poles in a rotor magnet. The armature coil also has curved sides each connecting neighboring apexes of the armature coil. Cogging generating protrusions are protruded from the stator yoke at positions spaced in a rotation direction of the rotor magnet from respective apexes of the armature coil by a desired angle.

The cogging generating protrusions correspond in number to the apexes of the armature coil and are uniformly spaced from one another.

In accordance with the present invention, the armature coil can also be installed at an accurate position by virtue of the cogging generating protrusions protruded from the stator yoke. In accordance with the present invention, the formation of the cogging generating protrusions and the coupling of the armature coil can also be simplified, thereby achieving an improvement in fabrication efficiency. It is also possible to provide a stable drive performance while obtaining an ideal drive torque even when a smaller amount of current is supplied.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
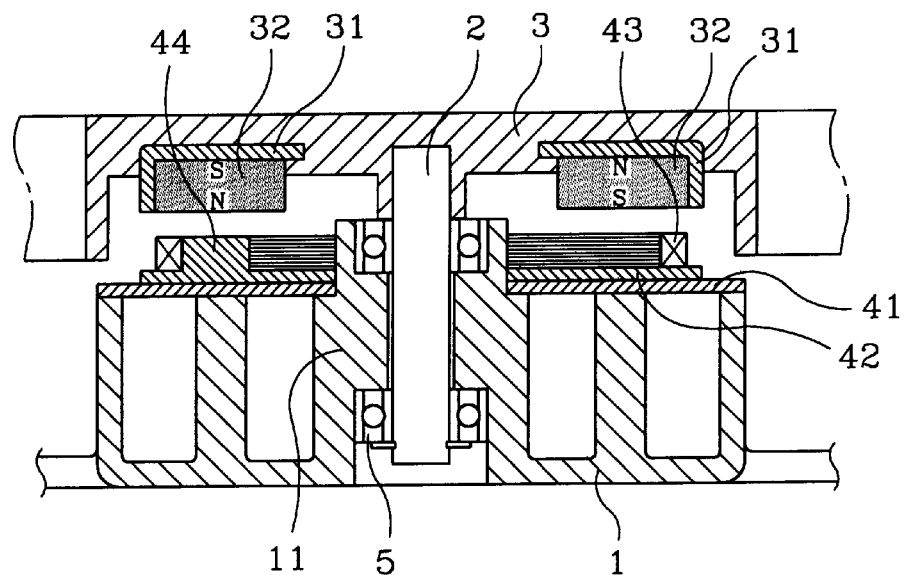
FIG. 1 is a sectional view illustrating a disk-type brushless single-phase DC motor according to the present invention.
Figure 3A:
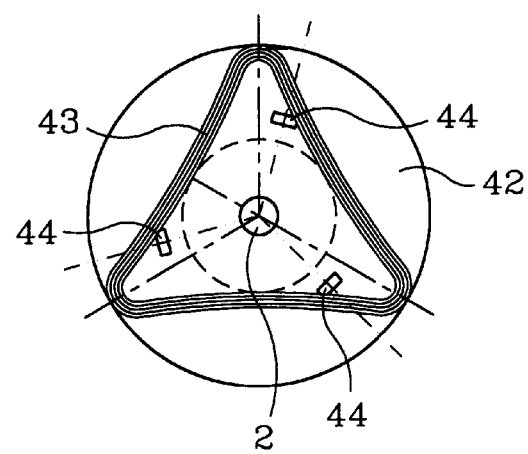
FIGS. 3a to 3d are plan views respectively illustrating various embodiments of an armature coil according to the present invention.
Figure 2:
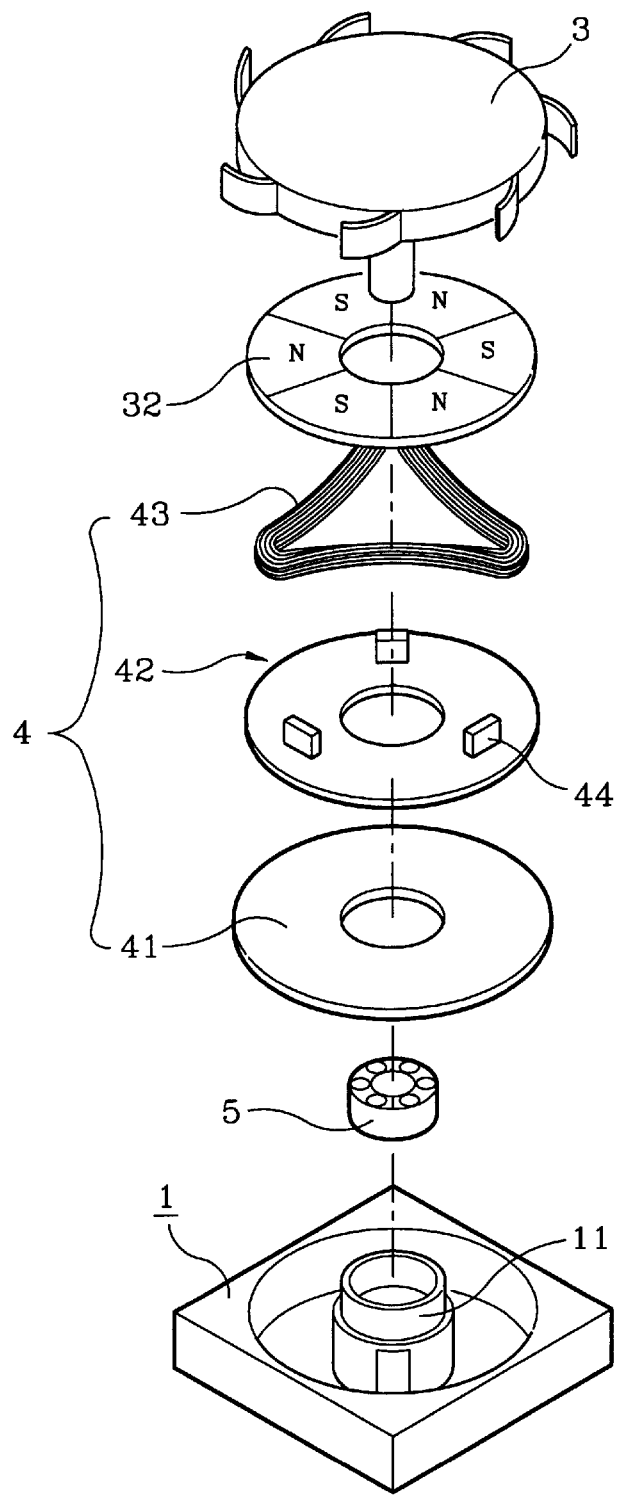
FIG. 2 is an exploded perspective view of the disk-type brushless single-phase DC motor shown in FIG. 1.
Figure 3B:
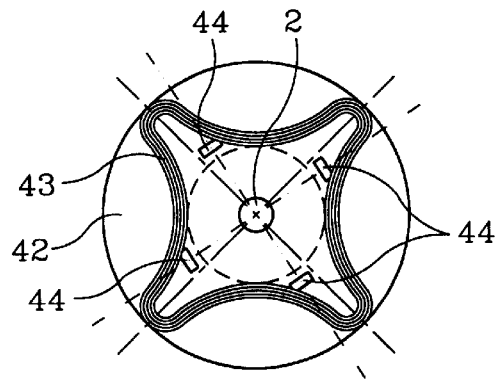
Figure 3C:
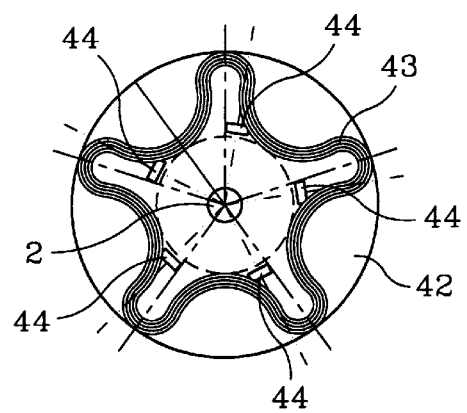
Figure 3D:
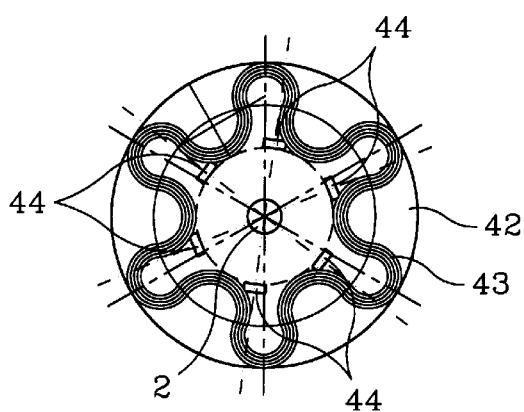

Referring to FIGS. 1 and 2, a disk-type brushless single-phase DC motor according to the present invention is illustrated, respectively. As shown in FIGS. 1 and 2, the motor includes a housing 1 constituting a lower portion of the motor, and a rotor 3 constituting an upper portion of the motor and arranged over the housing 1. The rotor 3 is rotatably coupled at its central portion to the central portion of the housing 1 by means of a shaft 2.

The shaft 2 is fixedly mounted at its upper end to the lower surface of the rotor 3. The shaft 2 extends downwardly through a hollow bearing holder 11 upwardly protruded from the central portion of the housing 1 in such a fashion that it is rotatably supported by bearings 5 mounted in the bearing holder 11.

The rotor 3 is a rotating member for the motor. A rotor magnet 32 is mounted on the lower surface of the rotor 3 by means of a magnetic yoke 32 attached to the rotor 3. The rotor magnet 32 has a flat annular shape and is provided with a plurality of alternating N and S poles. The number of poles in the rotor magnet 32 corresponds to 2P, where P is an integer not less than 1.

The bearing holder 11, which has a hollow structure, is upwardly protruded from the central portion of the housing 1. The upper end of the bearing holder 11 has a reduced diameter as compared to the lower end of the bearing holder 11 so that it has a stepped structure in order to seat a stator 4 thereon.

The stator 4 mainly includes a printed circuit board 41, a stator yoke 42 laid on the printed circuit board 41, and an armature coil 43 attached to the upper surface of the stator yoke 42. The printed circuit board 41 of the stator 4 serves to supply single-phase current from an external source to the armature coil 43 via circuits patterned on opposite surfaces thereof. The stator yoke 42 is a conductive flat plate laid on the printed circuit board 41 in such a fashion that it faces the rotor magnet 32. The armature coil 43, which is attached to the upper surface of the stator yoke 42, interacts with the rotor magnet 32, thereby generating an electromagnetic force.

FIGS. 3a to 3d illustrate various embodiments of the armature coil according to the present invention, respectively. In all cases, the armature coil 43 has a closed loop structure having a plurality of uniformly spaced apexes. A cogging generating protrusion 44 is protruded from the stator yoke 42 at a position spaced from an associated one of the apexes of the armature coil 43 by a desired angle. The cogging generating protrusion 44 serves as a load against a coil torque generated by virtue of an electromagnetic force interacting between the armature coil 43 and rotor magnet 32.

The number of apexes in the armature coil 43 corresponds to ½ of the number of poles in the rotor magnet 32. The number of cogging generating protrusions 44 each being positioned at an angle from an associated one of the apexes of the armature coil 32 also corresponds to ½ of the number of poles in the rotor magnet 32.

For example, where the rotor magnet 32 has 6 poles, the armature coil 43 has 3 apexes corresponding to ½ of the 6 poles. Where the rotor magnet 32 has 8 poles, the armature coil 43 has 4 apexes. For a rotor magnet having 10 or 12 poles, the armature coil 43 has a closed loop shape having 5 or 6 apexes.

Figure 7:
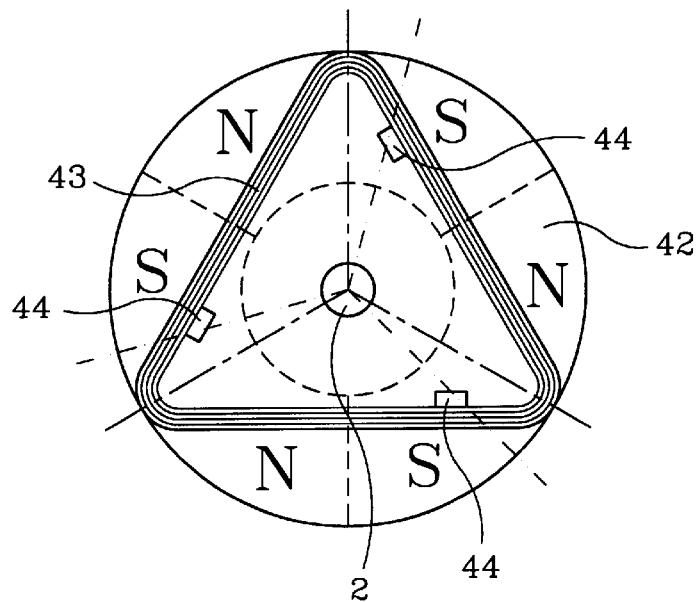
FIG. 7 is a view illustrating an armature coil having straight sides in accordance with the present invention.
Figure 8:
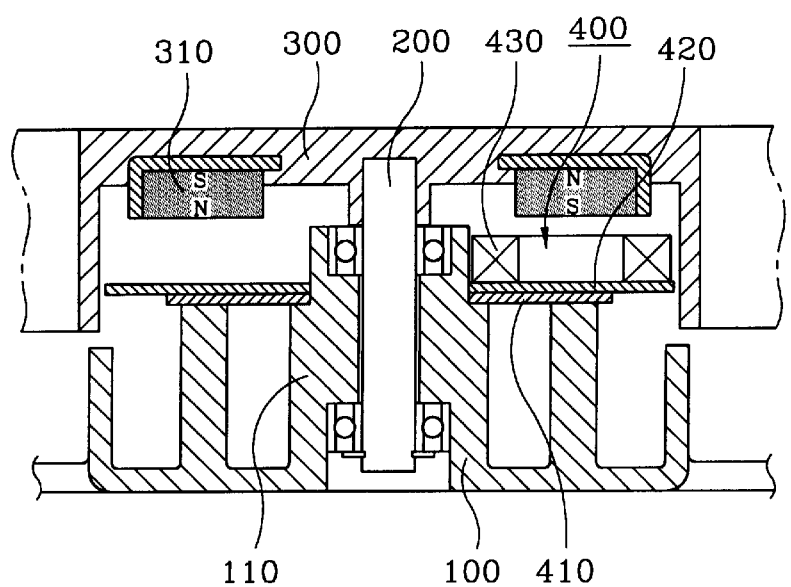
FIG. 8 is a sectional view illustrating a conventional disktype brushless single-phase DC motor.
Figure 9:
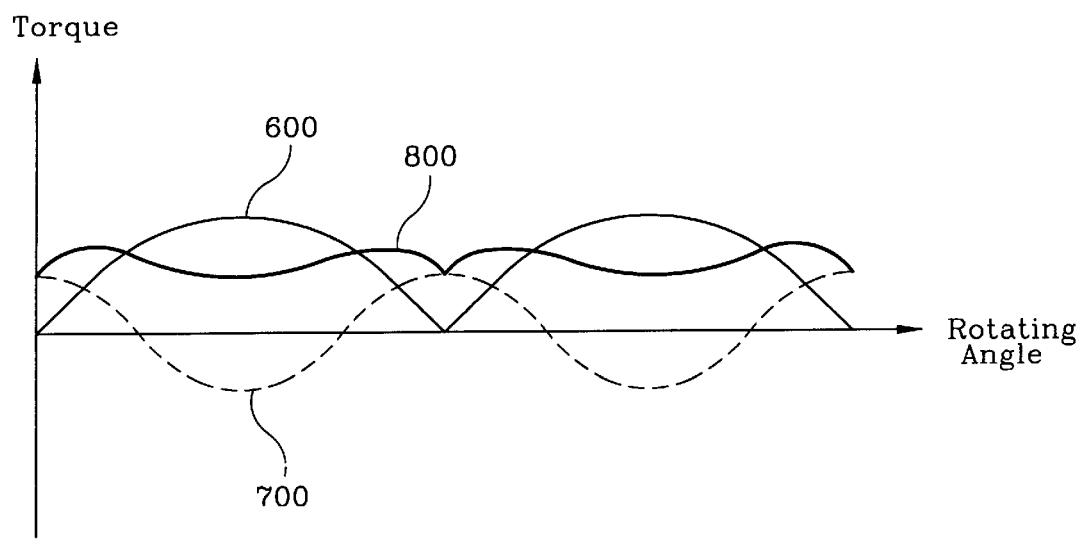
FIG. 9 is a waveform diagram of outputs generated in a conventional disk-type brushless single-phase DC motor.
Figure 10:
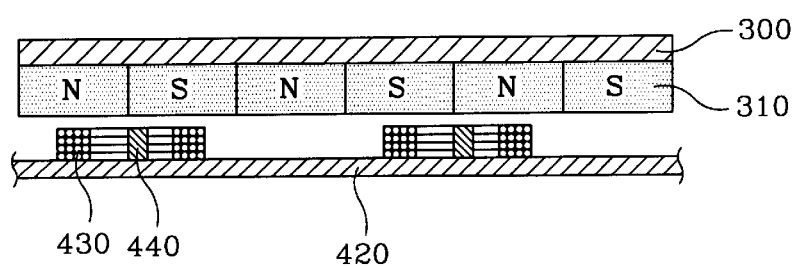
FIGS. 10 to 12 are views respectively illustrating various examples of conventional cogging generating protrusions.
Figure 11:
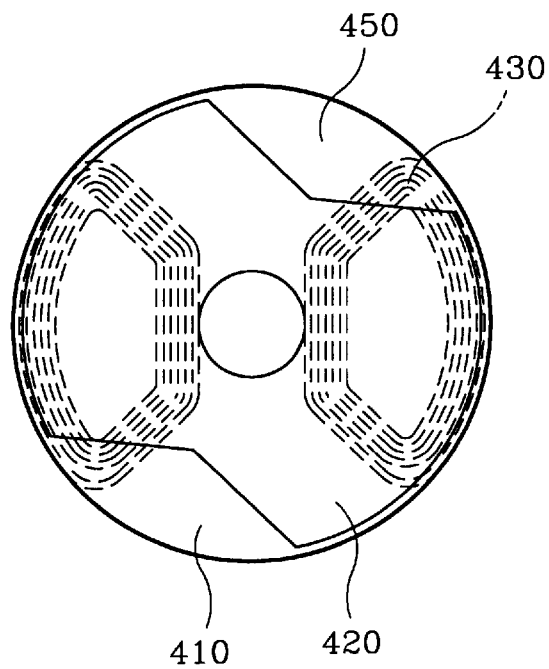
Figure 12:
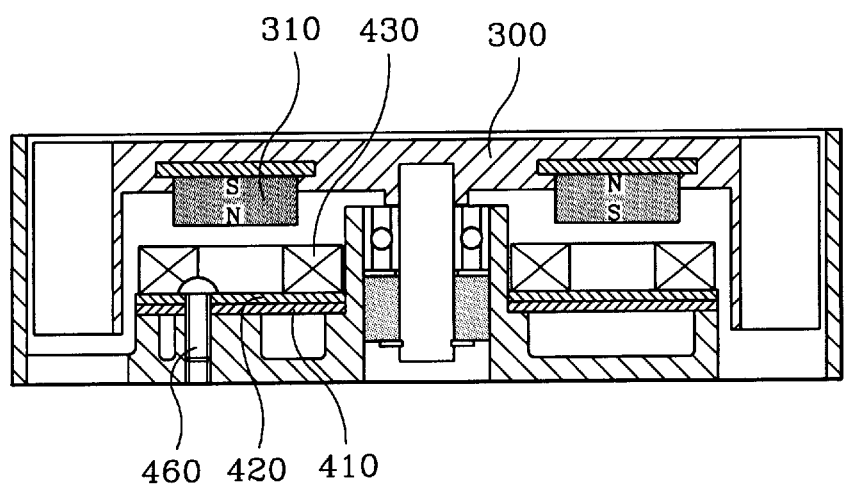

The armature coil 43 has sides each connecting neighboring apexes while being radially inwardly curved with a desired radius of curvature. Of course, the armature coil 43 may have straight sides in accordance with the present invention, as shown in FIG. 7. However, it is more preferable that the armature coil 43 have curved sides in terms of an increase in coil torque. This will be described hereinafter in detail. Each side of the armature coil 43 has a length not more than the pole width of the rotor magnet 32.

Each cogging generating protrusion 44 is arranged at a position spaced from an associated one of the apexes of the armature coil 43 by a desired angle in a rotation direction of the rotor magnet 32 without overlapping with the armature coil 43. Preferably, the angle of each cogging generating protrusion 44 from the associated apex of the armature coil 43 corresponds to ¼ of the angular width of one pole in the rotor magnet 32. The angular width of one pole in the rotor magnet 32 correspond. to the value obtained by dividing 360°, namely, the sum of angular widths of all poles in the rotor magnet 32, by the number of poles.

For example, where the rotor magnet 32 has 6 poles, the width of one pole thereof is 60° (360°/6). Accordingly, the angle of each cogging generating protrusion 44 from the associated apex of the armature coil 43 is 15° obtained by dividing the pole width of 60° by 4. That is, each cogging generating protrusion 44 is arranged at a position shifted by an angle of 15° from the associated apex of the armature coil 43 in the rotation direction of the rotor magnet 32.

In the cases wherein the rotor magnet 32 has 8 poles, 10 poles, and 12 poles, the position of each cogging generating protrusion 44 is spaced from the associated apex of the armature coil 43 by angles of 11.25°, 9°, and 7.5°, respectively.

Figure 4A:
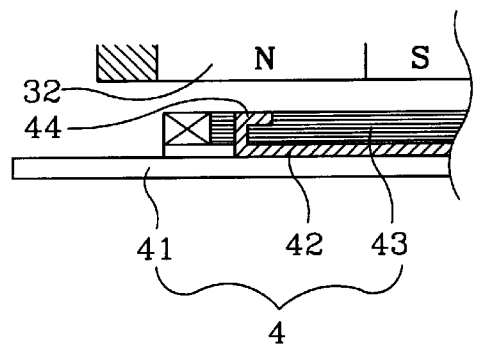
FIGS. 4a and 4b are sectional views respectively illustrating different embodiments of cogging generating protrusions according to the present invention.
Figure 4B:
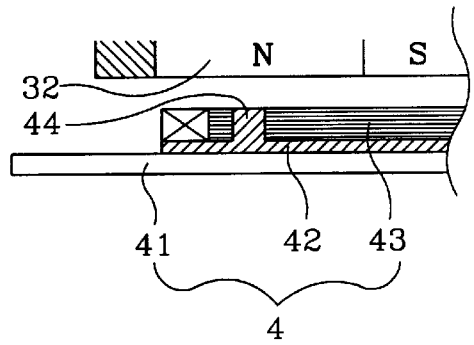

As shown in FIGS. 4a and 4b, the cogging generating protrusions 44 may be formed by partially cutting out the stator yoke 42 having a flat plate structure and upwardly bending desired portions of the stator yoke 42 at the edges of the cutouts in such a fashion that the upper end of the bent portions are arranged near the rotor magnet 32. Alternatively, the cogging generating protrusions 44 may be integrally formed with the stator yoke 42 in such a fashion that they are upwardly protruded from the upper surface of the stator yoke 42, when the stator yoke 42 is molded.

Meanwhile, a dead point, where the coil torque generated between the rotor magnet 32 and armature coil 43 during the rotation of the rotor becomes zero, is always formed at a fixed point spaced from each apex of the armature coil 43 by a constant angle. In this regard, it may be possible to use a single cogging generating protrusion or cogging generating protrusions reduced in number from the number of apexes of the armature coil 43 in accordance with the present invention. In this case, it is possible to expect a cogging generating effect identical or similar to those obtained when a plurality of cogging generating protrusions corresponding in number to the apexes of the armature coil 43.

Figure 5A:
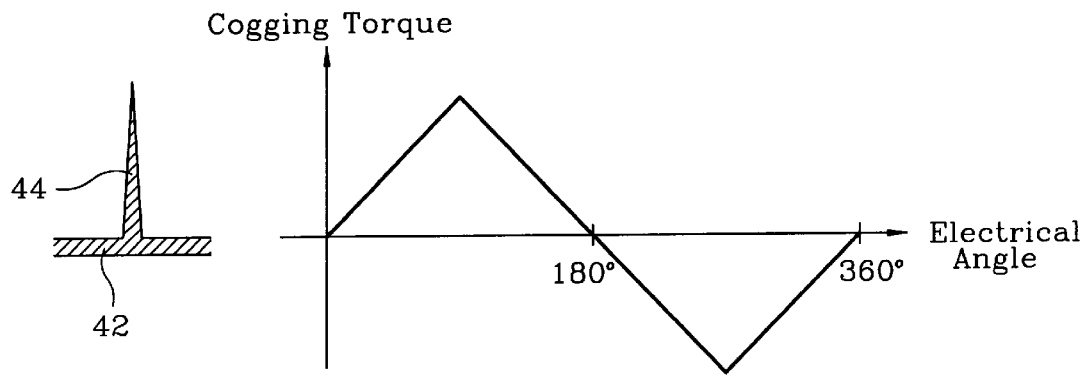
FIGS. 5a to 5c are diagrams respectively illustrating waveforms of cogging torques according to various shapes of cogging generating protrusions according to the present invention.
Figure 5B:
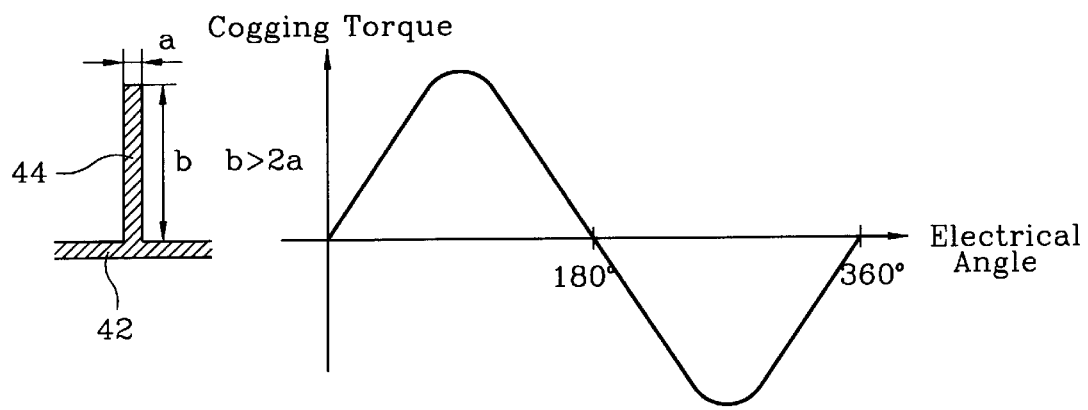
Figure 5C:
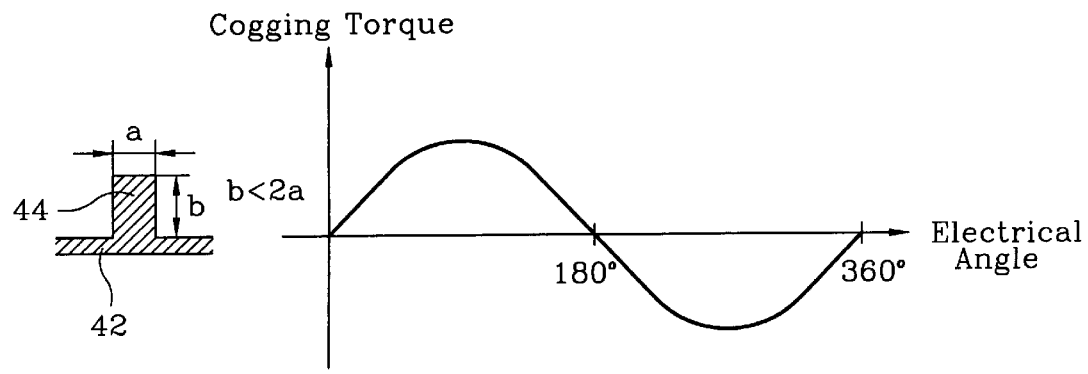

In particular, the cogging torque generated by each cogging generating protrusion 44 varies in various forms depending on different protruded structures of the cogging generating protrusion 44, as shown in FIGS. 5a to 5c. Accordingly, it is possible to effectively apply the present invention to a variety of motors having different magnetized structures for the rotor magnet by selecting an appropriate protruded structure of the cogging generating protrusion 44 in accordance with the magnetized structure of the motor to which the present invention is applied.

Where the magnetized structure of the rotor magnet 32 varies, the output form of the coil torque varies correspondingly. In order to obtain an ideal resultant torque with respect to such a varied coil torque, it is required to generate a cogging torque having an output form exhibiting the same variation as the output form of the coil torque. In accordance with the present invention, this can be easily achieved by simply varying the protruded structure of the cogging generating protrusion 44.

The height b of the cogging generating protrusion 44 determines the magnitude of the cogging torque whereas the width a of the cogging generating protrusion 44 determines an electrical angle at which a cogging is generated. The electrical angle corresponds to the sum of angles of two poles in the rotor magnet. In particular, the width a at the tip of the cogging generating protrusion 44 determines a variation in peak cogging torque. In accordance with the present invention, therefore, a cogging torque matching with the coil torque generated is generated by appropriately combining together the above mentioned design parameters for the cogging generating protrusion.

The output pattern of the cogging torque varies depending on the material of the cogging generating protrusion 44 as well as the size of the cogging generating protrusion 44, namely, the width a and height b. Accordingly, the size and material of the cogging generating protrusion 44 are appropriately adjusted to output a cogging torque matching with the coil torque generated, thereby generating an ideal resultant torque.

Figure 6:
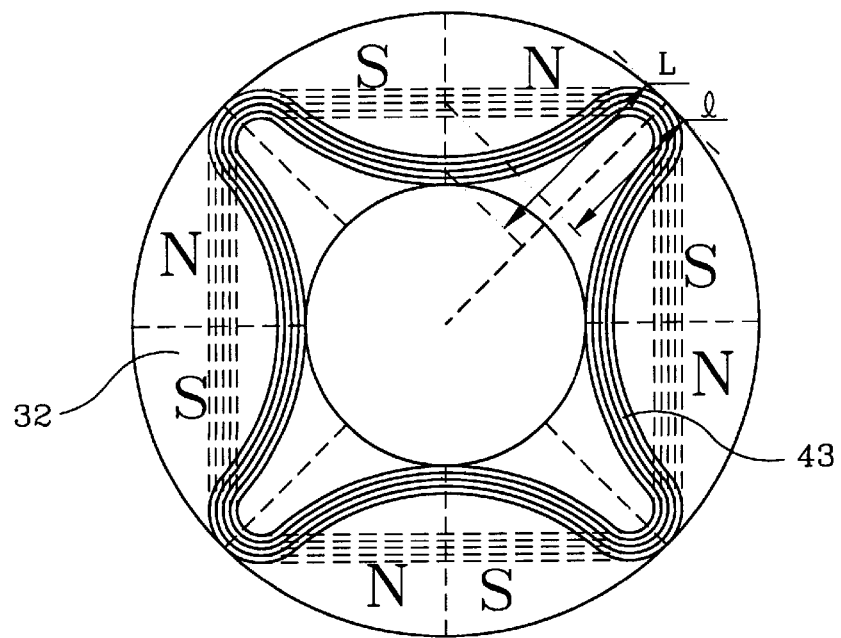
FIG. 6 is a schematic view illustrating the principle of improving an effective drive torque in accordance with the present invention.

It is preferred that the sides of the armature coil 43 connecting neighboring apexes have a curved shape rather than a straight shape, as shown in FIG. 6. It is more preferable that the inner surface of each curved side of the armature coil 43 extends radially inwardly to the inner peripheral surface of the rotor magnet 32 when viewed in a plan view. Referring to the equation "F=IL×B" with regard to the effective coil torque, established in accordance with Fleming's left-hand law, it can be understood that an increased effective radial length of the armature coil at an area, where N and S poles overlap with each other, results in an increase in coil torque, thereby reducing the consumption of current.

The effective radial length L of the armature coil, where the sides connecting neighboring apexes have a curved shape, is longer than the effective radial length l of the armature coil where the sides have a straight shape. In the case where the sides connecting neighboring apexes have a curved shape, accordingly, there is an advantage in that a higher coil torque can be obtained using a relatively reduced amount of supply current, I, thereby preventing loss of current.

Where each cogging generating protrusion 44 provided at the stator yoke 42 is arranged at a position, where it can come into contact with the armature coil 43, it serves as a guide upon coupling the armature coil 43. In this case, accordingly, the coupling of the armature coil 43 can be accurately achieved without using any jig. The cogging generating protrusions 44 also serves to prevent the coupled armature coil 43 from moving. Accordingly, a more stable workability is provided when the stator yoke 42 and armature coil 43 are fixed to each other by means of an adhesive.

In accordance with the present invention, therefore, it is possible to eliminate use of special tools and associated processes upon assembling elements of the motor because it is unnecessary to use any jig required in conventional cases.

Since the armature coil 43 comprises a single coil having a closed loop shape in accordance with the present invention, the fabrication thereof can be simplified. It is also possible to greatly reduce loss of an electromagnetic force generated between the rotor magnet 32 and armature coil 43, thereby maximizing the torque efficiency of the motor.

In accordance with the present invention, the cogging generating protrusions 44 are integrally formed with the stator yoke 42. Accordingly, the number of processes for forming the cogging generating protrusions 44 is reduced. Furthermore, the variation in the shape and size of the cogging generating protrusions 44 can be more freely achieved. Accordingly, it is very easy to cope with a change in the use purpose of the motor or a variation in the magnetized structure of the rotor magnet.

In particular, the formation of the cogging generating protrusions 44 is carried out simultaneously with the fabrication of the stator yoke 42 in accordance with the present invention. Accordingly, there is a great advantage in terms of a mass production. Since the cogging generating protrusions 44 can serve as a guide upon coupling the armature coil 43 to the stator yoke 42, this coupling can be more accurately achieved. As a result, an enhancement in productivity is obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A disk-type brushless single-phase DC motor comprising:
    a flat annular rotor magnet fixedly mounted to a rotor by a rotor magnet yoke and provided with a plurality of alternating N and S poles having the same area, the number of the poles corresponding to 2P, where P is an integer not less than 1;
    a stator interfacing with the rotor magnet, thereby generating an electromagnetic force, the stator comprising:
        a stator yoke arranged coaxially with the rotor magnet in such a fashion that it has a face-to-face relation with the rotor magnet, and
        an armature coil laid on the stator yoke, the armature coil having a closed loop structure extending over all of the poles of the rotor magnet and having apexes corresponding in number to ½ of the number of poles in the rotor magnet, the apexes being arranged near an outer peripheral surface of the rotor magnet; and
    at least one cogging generating protrusion, said protrusion protruding upwardly from the stator yoke and being integral with the stator yoke, the cogging generating protrusion being spaced from respective apexes of the armature coil by an angle corresponding to ¼ of an angular width of one pole in the rotor magnet, the angular width of one pole in the rotor magnet corresponding to a value obtained by dividing 360° by the number of poles in the rotor magnet, said cogging protrusion being positioned on the stator yoke to contact and guide the armature coil to a determined position on the stator yoke.

2. The disk-type brushless single-phase DC motor according to claim 1, wherein the armature coil of closed loop structure has sides each connecting neighboring ones of the apexes while being radially curved with a desired radius of curvature.

3. The disk-type brushless single-phase DC motor according to claim 2, wherein the sides of the armature coil which are radially inwardly curved extend to an inner peripheral surface of the facing rotor magnet.

4. The disk-type brushless single-phase DC motor according to claim 1, wherein a plurality of said cogging generating protrusions are provided equal in number to the number of said apexes, the protrusions being equally spaced from one another are spaced from respective said apexes of the armature coil by said angle of ¼ of the angular width of one pole of the rotor magnet.

\* \* \* \* \*